United States Patent

[11] 3,583,161

| [72] | Inventor | Richard Simms<br>Manhattan Beach, Calif. |
|---|---|---|
| [21] | Appl. No. | 569,282 |
| [22] | Filed | Aug. 1, 1966 |
| [45] | Patented | June 8, 1971 |
| [73] | Assignee | Granted to U.S. Atomic Energy Commission under the provisions of 42 U.S.C. 2182 |

[54] RADIOISOTOPE/ELECTROTHERMAL THRUSTER
4 Claims, 1 Drawing Fig.

[52] U.S. Cl. ............................................. 60/203
[51] Int. Cl. ........................................ F02k 11/00
[50] Field of Search ................................. 60/202, 203, 227

[56] References Cited
UNITED STATES PATENTS

| 2,765,975 | 10/1956 | Lindenblad | 60/203X |
| 2,970,436 | 2/1961 | Sims | 60/203X |
| 2,974,495 | 3/1961 | Pinnes et al. | 60/203WX |
| 3,188,799 | 6/1965 | Flynn | 60/203X |
| 3,260,044 | 7/1966 | Garraway | 60/203X |
| 3,280,568 | 10/1966 | Friedman et al. | 60/203 |
| 3,293,854 | 12/1966 | Walker | 60/227 |
| 3,315,471 | 4/1967 | Dailey et al. | 60/203 |

FOREIGN PATENTS

| 564,875 | 10/1944 | Great Britain | 60/227 |

*Primary Examiner*—Carlton R. Croyle
*Attorney*—Roland A. Anderson

ABSTRACT: To provide for greater efficiency in a monopropellant rocket engine, an upstream radioisotope heater and a downstream electric heater or other electrothermal source is provided.

PATENTED JUN 8 1971
3,583,161
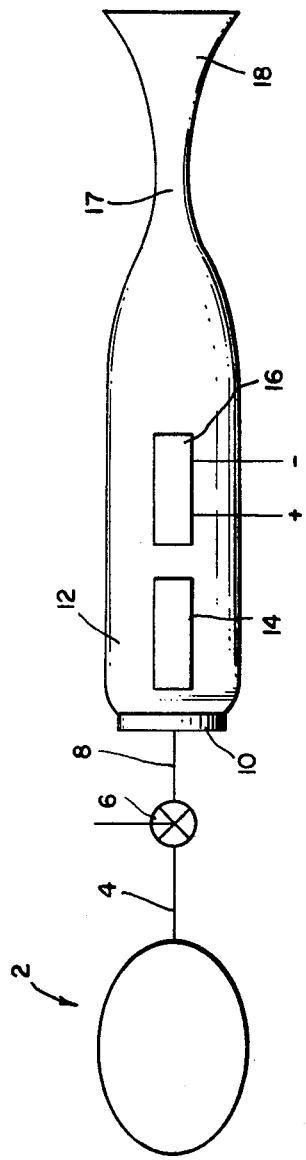
Richard Simms,
INVENTOR.
BY.
Donald W. Graves
ATTORNEY.

RADIOISOTOPE/ELECTROTHERMAL THRUSTER

This invention relates to a gas-generating device.

More particularly, this invention relates to a gas-generating device such as a rocket engine or the like in which a combination of a radioisotope and an electric heater or electrothermal source is provided to heat a propellant so as to expand it to a gas to produce useful thrust.

Gas-generating devices, a term which is intended to include rocket engines known in the prior art, comprises many forms. These include the solid propellant rockets which are rocket nozzles containing propellant in the solid form. The propellant, when ignited, will undergo combustion so as to expand gas through a throat portion to provide thrust.

Another type of gas-generating device is the hybrid rocket engine in which a liquid propellant and a solid propellant are provided which undergoes combustion to produce useful thrust.

The most common type of propulsion known in the art is the liquid propellant rocket engines. These may comprise an engine using two or more propellants which are mixed in a combustion chamber and ignited by any of the well-known ignition devices to provide gas and therefore thrust as it is expanded through a throat region.

Within recent years technology has advanced to the state where monopropellant fluids can be injected into a combustion chamber and by either a catylist or upon the application of heat will produce gas and therefore thrust. It is to this type of engine to which this invention is principally directed.

Several approaches have been made in the past to change a monopropellant from either a gas or liquid to a gas having a higher temperature which is expanded in a nozzle to produce useful thrust. A fairly common way is to provide heat to the gas by the application of a radioisotope heat source which typically is embedded within the combustion chamber. The monopropellant passes over the radioisotope so as to absorb heat therefrom. Still another approach to this problem of heating the propellant has been to use an ordinary electric heater which when supplied with power will heat the propellant and thus transfer energy to the propellant.

There are several disadvantages with both of the above examples. With the radioisotope heat source, present day technology is unable to construct a capsule containing the radioisotope to operate at a temperature much in excess of 1,500° F. With this limitation, a relatively low amount of heat can be transferred to the propellant, thus resulting in inefficient expansion of the gas. This tends to lower the specific impulse which is measured by the thrust generated by the expanding gases as divided by the mass flow rate. Thrust is dependent upon the temperature of the gas. Since the radioisotope capsule is limited to the temperature of 1,500° F., it can be seen that the specific impulse generated by the gas-generating device is limited. Although 1,500° F. is given as an example, it is understood that other temperatures are within the scope of this invention.

With the use of an electric heater, the designer is not troubled by the temperature limitations of the radioisotope capsule. It is well within the state of the art, for example, to construct electric heaters which can operate in the neighborhood of 3,500° F. However, electrothermal or electric heaters tend to have a reliability problem in that failures have occurred in the heaters during operation of the gas-generating devices.

With the advent of space vehicles, there is a need for both high specific impulses as well as reliability. In addition, it is desirable and often necessary to keep the total system weight of the propulsion system to a minimum.

It is to obviate the disadvantages of the above enumerated prior art structures to which this invention is directed. In its most briefest aspect, this invention comprises the combination of a radioisotope heat source and an electrothermal heat source. The radioisotope heater preheats the monopropellant to a given temperature after which it is passed over an electrical heating system which raises the temperature still further.

The objects and advantages of this invention will become apparent as this description proceeds, taken in conjunction with the accompanying drawing in which:

The single FIGURE is a schematic view of the combination according to the invention.

Referring now to FIG. 1, there is a schematic view of an apparatus embodying the features of this invention. Shown at 2 is a tank for storage of propellant such as ammonia ($NH_3$). A propellant line 4 leads from tank 2 and through a suitable valve structure 6 is passed into line 8. From line 8, the propellant is injected through an injector 10 into combustion chamber 12. As thus far described, the structure is conventional. A radioisotope heat source such as, for example, described in U.S. Pat. No. 3,210,926 or in copending U.S. Pat. application Ser. No. 505,090, now U.S. Pat. No. 3,315,471, both assigned to the assignee of this invention, is shown at 14.

As propellant entering combustion chamber 12 passes around radioisotope 14 in heat exchange relationship thereto, it is heated to a complete gaseous phase which, when expanded through throat region 16 and against walls 18, will produce useful thrust. As mentioned supra, however, radioisotope technology is such that the capsule cannot be constructed to withstand temperatures much in excess of 1,500° F.

As a part of this invention, an electrical heater such as shown at 16 is provided which may comprise a simple resistance-type heater well known in the art. This heater functions to further heat the gas after passing in heat exchange relationship with capsule 14 so as to further raise the temperature thereof and hence the specific impulse of the gas.

The advantages of this system are several. By a combination of the radioisotope capsule and the electric heating unit, total system weight is less that of an electric heating system alone. This is due primarily to the power requirements of the electric heater which must be separately provided. In addition, the combination of the radioisotope heater and the electric heater provides for much greater reliability of the system as a whole as compared with the use of an electric heater alone. Electric heaters have a propensity towards failure, and in use upon a spacecraft where mission requirements in the future may approach years, it is seen that by providing a redundant system, that is, a backup radioisotope heater, that at least some thrust can still be generated should the secondary electrical system fail. Finally, the advantages over the radioisotope heating system alone is apparent in that the specific impulse of the system is greater due to the additional heating effect of the electrical system when added to that provided by the radioisotope heater used alone.

Having described this invention, it is to be understood that it is to be limited only by the scope of the claims appended hereto.

What I claim is:

1. In a gas-generating device having a chamber adapted to receive propellant and a throat for passage of gas to produce thrust, that improvement which comprises;
    a first heater adapted to heat said propellant to a predetermined temperature,
    a second heater downstream of said first heater, said second heater being adapted to heat said propellant to a higher predetermined temperature than said first heater;
    said first heater comprising a radioisotope, said second heater comprising an electric heater.

2. In a gas-generating device according to claim 1 wherein said second heater is adapted to be operated independently of said first heater.

3. In a gas-generating device according to claim 1 wherein said propellant comprises a monopropellant.

4. In a gas-generating device according to claim 3 wherein said monopropellant is ammonia.